(12) United States Patent
Harris

(10) Patent No.: US 6,212,437 B1
(45) Date of Patent: Apr. 3, 2001

(54) BANDSAW CONTROLLER FOR AUTOMATICALLY CONTROLLING THE FEED RATE AND CUTTING SPEED OF THE BANDSAW CUTTING BLADE

(75) Inventor: Gerald R. Harris, Choteau, OK (US)

(73) Assignee: HEM, Inc., Pryor, OK (US)

( * ) Notice: Subject to any disclaimer, the term of this patent is extended or adjusted under 35 U.S.C. 154(b) by 0 days.

(21) Appl. No.: 09/104,847

(22) Filed: Jun. 25, 1998

(51) Int. Cl.$^7$ .................................................. G06F 17/00
(52) U.S. Cl. .................................. 700/40; 700/46; 83/73; 83/871
(58) Field of Search .................................. 83/73, 74, 871, 83/872; 700/40, 9, 28, 46; 710/14, 8, 15

(56) References Cited

U.S. PATENT DOCUMENTS

| | | | |
|---|---|---|---|
| 4,442,494 | * | 4/1984 | Fromson et al. ................. 702/34 |
| 4,809,200 | * | 2/1989 | Moore et al. ................... 702/176 |
| 4,896,273 | * | 1/1990 | Moore et al. ................... 364/505 |
| 5,727,912 | * | 3/1998 | Rubashkin et al. ............. 409/132 |
| 6,044,822 | * | 4/2000 | Daniels ........................... 123/196 R |

OTHER PUBLICATIONS

"A look at the latest in sawing developments", Metal/Center News, vol. 5 No. 1, p. 52, Jan. 1995.*

Gerald R. Harris, "Band sawing", Tooling & Production, vol. 61 No. 12, p. 81, Mar. 1997.*

Jean V. Owen, "Bandsaws join the mainstream", Manufacturing Engineering, vol. 118 No. 2, p. 28, Feb. 1997.*

* cited by examiner

Primary Examiner—Thomas Lee
Assistant Examiner—Thuan Du
(74) Attorney, Agent, or Firm—Flehr Hohbach Test Albritton & Herbert LLP

(57) ABSTRACT

A bandsaw (21) and bandsaw controller (39) adapted for control f at least one of the feed rate, cutting force and cutting speed of a bandsaw blade (24) as the blade cuts a workpiece (26). The controller includes an input device (61) adapted to provide signals to the cutting rate control assembly including a cutting rate signal, a break-in mode signal and a break-through mode signal. The cutting rate control assembly is responsive to the break-in mode signal to begin cutting of workpiece (26) at a break-in cutting rate below the desired cutting rate and to increase the break-in cutting rate automatically, as a function of time until the desired cutting rate is achieved. The cutting rate control assembly is further responsive to the break-through mode signal to reduce the saw cutting rate just before the saw blade (24) exits from the workpiece (26). A method of operation of the bandsaw (21) to effect saw blade break-in and prevent detrimental saw blade break-through also is provided.

18 Claims, 3 Drawing Sheets

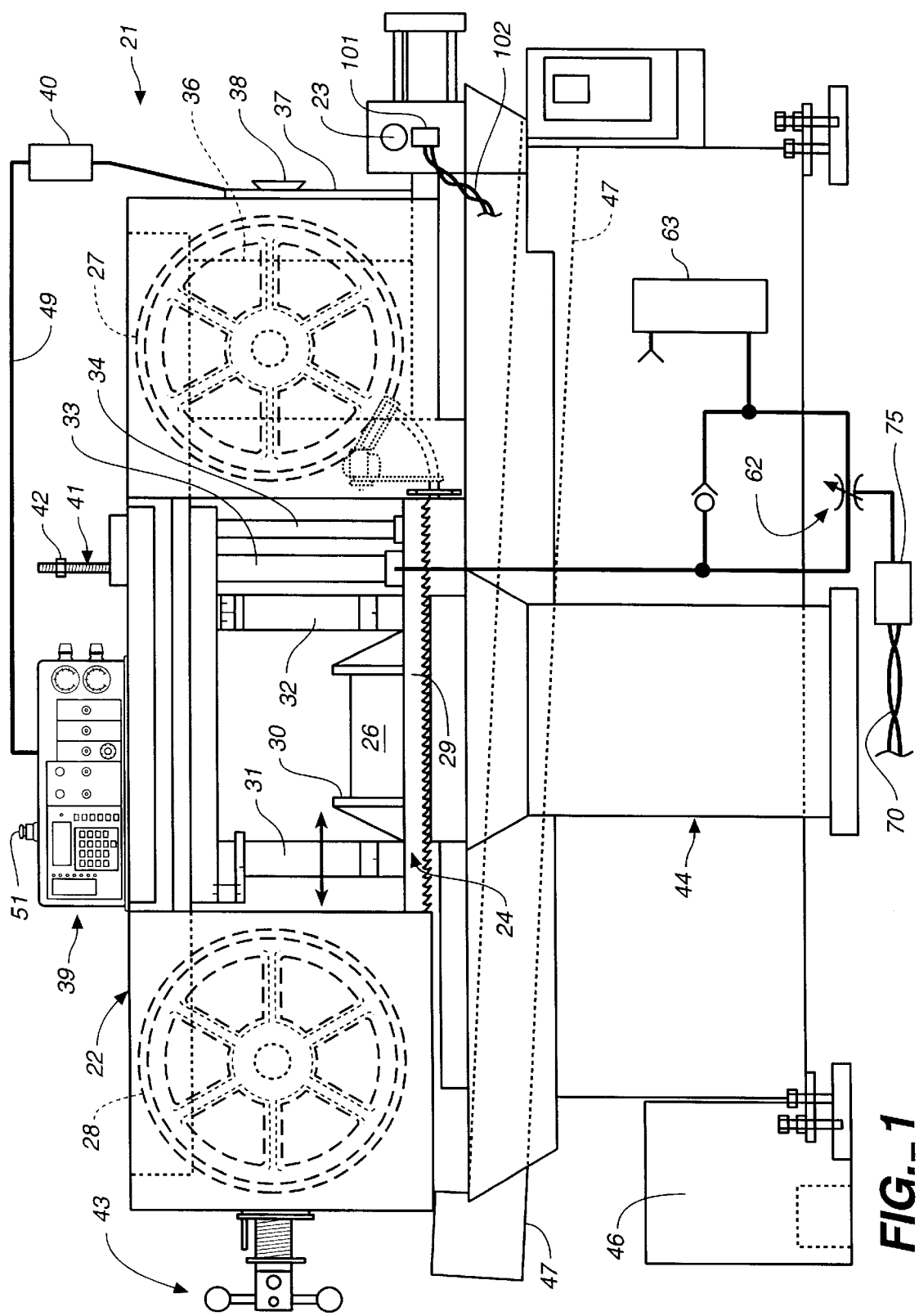
FIG._1

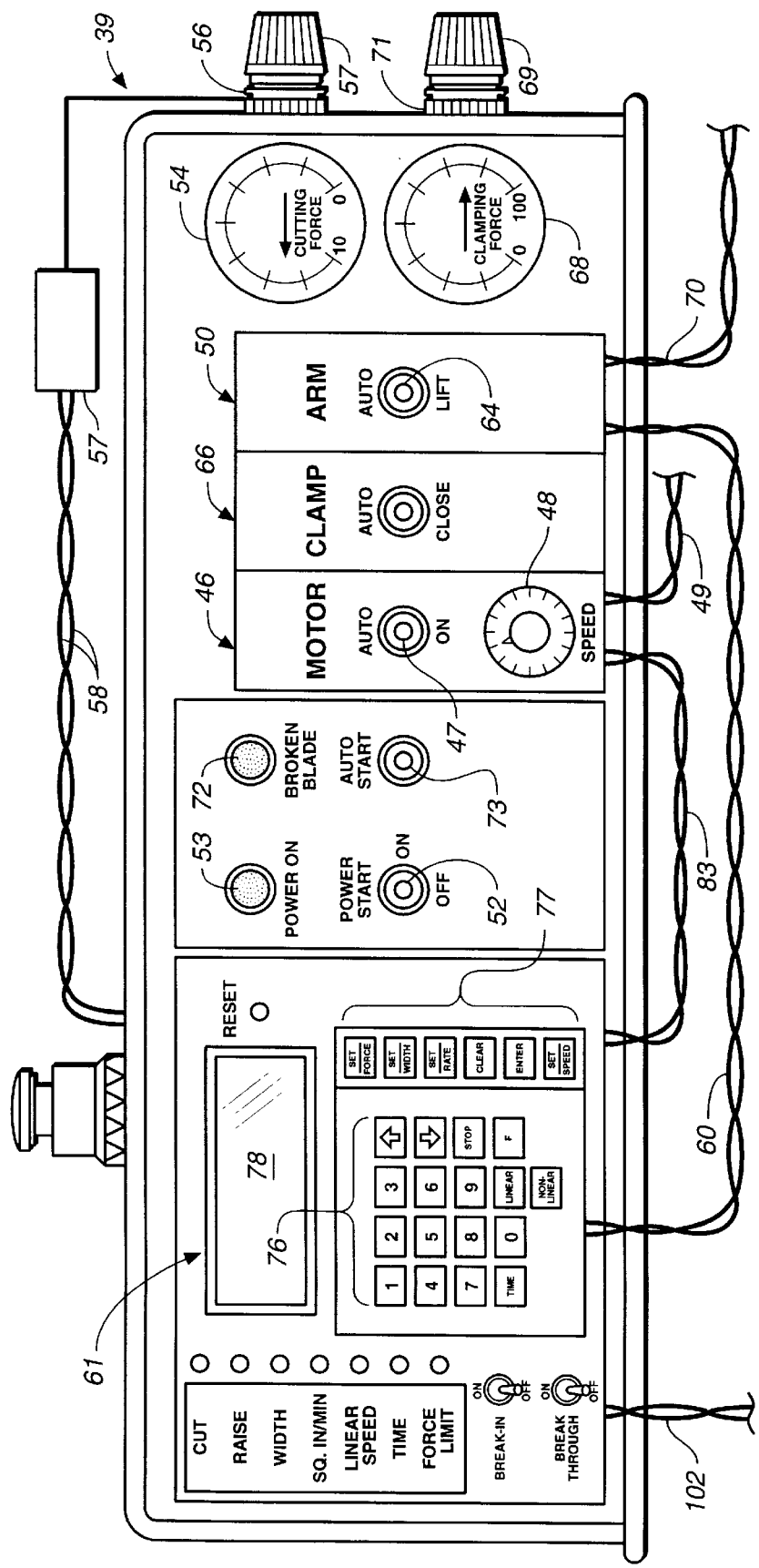
FIG._2

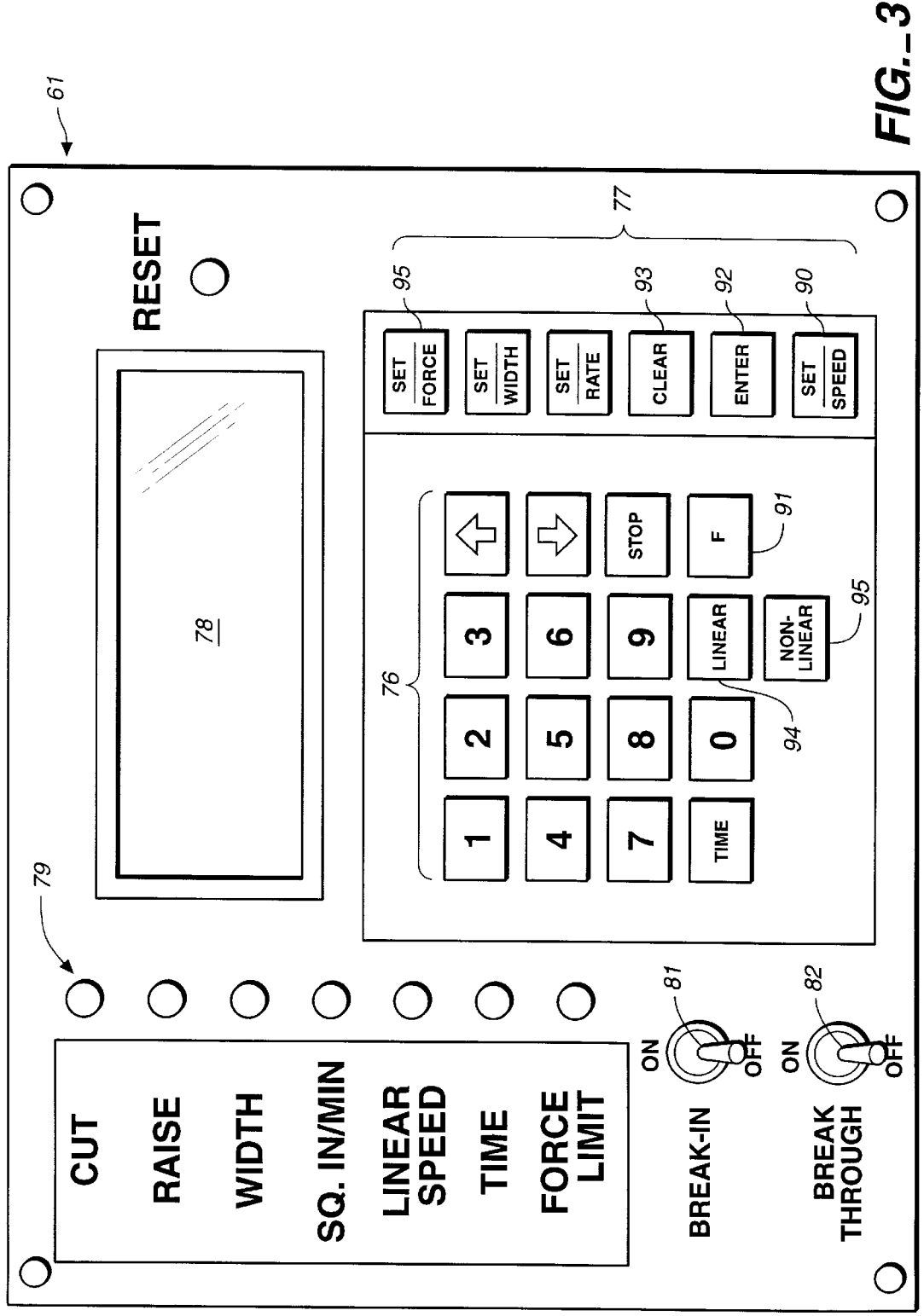
FIG._3

BANDSAW CONTROLLER FOR AUTOMATICALLY CONTROLLING THE FEED RATE AND CUTTING SPEED OF THE BANDSAW CUTTING BLADE

TECHNICAL FIELD

The present invention relates, in general to bandsaws, and more particularly, relates to bandsaw controllers for controlling the feed rate and cutting speed of bandsaw cutting blades.

BACKGROUND ART

In industrial bandsaws used for high precision, high volume output, considerable care has to be taken in order to optimize wear on the bandsaw blades. Since high-strength alloy metals are often cut using such saws, the blades often must be carbide or other hard materials capable of cutting such workpieces. Thus, the cost of industrial bandsaw blades is significant, and the cost associated with shutting down production from the bandsaw while a blade is being replaced is also significant.

Two commonly occurring problems can significantly reduce the life of a bandsaw blade. First, there is the problem of saw blade break-in. Second, blade life can be significantly reduced by bandsaw blade break-through.

If a bandsaw is operated at a constant pressure with a brand new blade, the saw will begin cutting at a first cutting rate and then the cutting rate will increase as the blade dulls slightly and begins cutting more efficiently. Over time, the bandsaw blade will dull further and the cutting rate will slow down. Thus, some dulling of the initially very sharp bandsaw blade is desirable in terms of increasing cutting efficiency. However, if a new bandsaw blade is operated at the nominal or desired cutting rate for a given workpiece, such high speed operation can unduly stress and even break or tear teeth on the blade. Moreover, high speed operation also can cause the blade teeth to become dull in an uneven manner. Thus, teeth may dull on one side or the other, rather than evenly across the tooth, and cause the blade to begin to pull away from a straight-line cut. With time, such uneven blade wear tends to become accentuated, which further tends to pull the blade during cutting and reduce the cutting life during which the blade will cut within acceptable tolerances.

It is known in the bandsaw industry that operation of a bandsaw blade during a break-in period at a cutting rate which is below the nominal or desired optimal cutting rate for production cutting will result in an eventual enhancement of production cutting efficiency and a more even dulling of the cutting blade teeth, with an attendant increase in blade life. What has been done in practice, therefore, is to manually set the bandsaw cutting rate at a level which is significantly below the optimal production cutting rate for the workpiece and thereafter periodically manually adjust the cutting rate up to the desired production rate. This break-in technique requires operator training, and predictably some operators are not reliable in their attention to using a break-in cutting rate or to increasing the same over time in an optimal fashion to the production rate.

The problem of bandsaw break-through is related to bandsaw-break-in in that it also can significantly shorten blade life. As a bandsaw blade is exiting a workpiece, there is a thin section of the workpiece material just before the cut is completed. At production feed rates, the bandsaw blade teeth can punch through the thin workpiece section suddenly, which dramatically loads or stresses the teeth and can fracture edges of the teeth. Carbide bandsaw blades are particularly susceptible to this problem in that carbide is strong in the compression loading experienced by normal cutting but not as strong in tension loading which occurs upon break-through. The break-through phenomenon also can effect the quality of the resulting workpiece, but that is generally less of a problem than the effect of break-through on saw blade life.

Again, some operators have manually reduced the saw blade feed rate just prior to exiting the workpiece. This reduction in feed rate reduces the force and depth of the workpiece section at which the teeth finally punch through the workpiece. Such feed rate reduction is known to be effective in reducing break-through saw blade damage, but in industrial bandsaw settings, operators simply are not able to be as attentive to this problem as would be desirable optimally. One compromise approach which is sometimes taken is to reduce the production cutting rate somewhat so as to lessen the break-through problem, but this obviously compromises the optimum production output.

Accordingly, it is an object of the present invention to provide a controller for a bandsaw which is capable of optimal control of both the break-in and the break-through feed rates of the bandsaw cutting blade so as to enhance bandsaw blade life.

Another object of the present invention is to provide a method for controlling the rate of cutting of a bandsaw blade during one or both of bandsaw break-in and bandsaw break-through so as to increase bandsaw blade life.

A further object of the present invention is to provide a method and apparatus for automated break-in of the cutting blade of a bandsaw so that damage to the blade teeth during break-in is avoided and blade life is optimized.

Still a further object of the present invention is to provide a controller and method of operating a bandsaw which will yield improved cutting characteristics in the cut workpiece, reduce operator error, and enable attainment of optimum production cutting speeds in a minimum amount of time.

The apparatus and method of the present invention have other objects, features and advantages which will become apparent from and are set forth in more detail in the accompanying drawing and following description of the Best Mode of Carrying Out the Invention.

DISCLOSURE OF THE INVENTION

In one aspect, the present invention is comprised of a controller adapted for connection to and control of the operation of a bandsaw during blade break-in. The controller comprises, briefly, a cutting rate control assembly adapted for connection to the bandsaw to control at least one of the feed rate of the bandsaw and the cutting speed of the bandsaw blade; and an input device responsive to operator input to provide input signals to the cutting rate control assembly. The input signals include a cutting rate signal, which establishes a desired or optimal production cutting rate, and a break-in mode signal, which establishes one or more break-in cutting rates. The cutting rate control assembly is responsive to the cutting rate signal to operate the bandsaw at the desired cutting rate and is further responsive to the break-in mode signal to begin cutting of the workpiece at a break-in cutting rate below the desired cutting rate. Finally, the cutting rate control assembly is further responsive to the break-in mode signal to increase the break-in mode cutting rate automatically as a function of time until the break-in cutting rate substantially equals the desired cutting rate.

In another aspect of the invention, the controller input device is further formed to provide a break-through signal to the cutting rate control assembly, and the cutting rate control assembly is responsive to the break-through cutting signal to reduce the rate of cutting of the bandsaw from a desired or optimal cutting rate to a break-through cutting rate when the bandsaw blade reaches a position proximate exiting of the workpiece. The input device, in this aspect of the invention, can be one of a position sensing transducer provided on the bandsaw, or manual input to the input device by the operator.

In the most preferred controller, both break-in mode signals and break-through signals are provided for control of the bandsaw, and the break-through cutting rate is determined by the controller to be the lower of the break-in cutting rate in the break-out cutting rate when the saw blade is in a position proximate exiting the workpiece.

BRIEF DESCRIPTION OF THE DRAWING

FIG. 1 is a front elevation, partially schematic view of a pivotal alarm bandsaw having a controller constructed in accordance with the present invention.

FIG. 2 is an enlarged, front elevation, partially schematic view of the bandsaw controller of FIG. 1.

FIG. 3 is a further enlarged, front elevation view of the operator input device of the controller.

BEST MODE OF CARRYING OUT THE INVENTION

The controller and method of the present invention can be employed with pivotal arm bandsaws and bandsaws that have linearly traveling, horizontally or vertically movable carriages, such as a double column supporting vertically displaceable carriage. As illustrated in the drawing, however, a pivotal arm bandsaw, generally designated 21, is shown. Bandsaw assembly 21 includes an arm assembly, generally designated 22, which is pivoted at axle or pivot shaft 23 in order that saw blade 24 can be pivoted down across workpiece 26. Mounted at one end of saw arm 22 is a drive wheel assembly 27, while an idler wheel assembly 28 is provided at the other end of the saw arm. Blade 24 is distended between and movably mounted on the idler and drive wheels. The cutting stretch 29 of saw blade 24 is guided by guide assemblies 31 and 32, at least one of which is mounted for horizontal reciprocation to enable a positioning close to workpiece 26. In this case, guide assembly 31 is horizontally movable as indicated by the arrows. Preferably, workpiece 26 is held by a vice, which also includes at least one horizontally movable clamping jaw 30.

Lifting and control of the descent of saw arm 22 is accomplished on the saw of FIG. 1 by a lift cylinder assembly. In the bandsaw illustrated in FIG. 1, a hydraulic lift cylinder 33 is mounted in series with a pneumatic lift cylinder 34 for control of arm descent and thus the feed rate of bandsaw blade 24 through the workpiece. Coupled to drive drive wheel 27 through a variable speed assembly 37 is a constant speed motor 36. Saw blade speed can be manually adjusted by the operation through a blade speed control wheel 38 on variable speed drive assembly 37, or through a bandsaw controller assembly, generally designated 39, which is coupled to an actuator 40 (schematically shown) which operates the variable speed drive. Variable speed drive actuator 40 can be, for example, a solenoid or pneumatic actuator coupled to controller 39. Lifting and descent of bandsaw arm assembly 22 also are controlled by the controller 39, in a manner which will be described in more detail hereinafter. Mounted on lift cylinder 33 is a stop assembly 41 with a manually adjustable lift member 42 that can be set to control the uppermost position to which arm 22 can be raised. The bandsaw also can include a blade tensioning assembly, generally designated 43, a workpiece discharge table 44, coolant tank 46 and a chip auger 47.

As thus far described, bandsaw 21 is constructed in a manner which is well known in the art, and as above indicated the present invention is applicable to many other types of bandsaws having still further optional features and attachments.

Referring now to FIG. 2, the details of controller assembly 39, which is adapted for automated control of the operation of bandsaw 21, can be discussed. Controller 39 includes a cutting rate control assembly adapted to control at least one of the bandsaw arm feed rate, cutting force or the bandsaw blade speed. Most preferably, all of the feed rate cutting force and blade speed are controlled by controller 39. Thus, as used herein, the expression "cutting rate control assembly" shall include one or all of a blade speed control module 46, a cutting force control assembly 56 and an arm descent control module 50.

Blade speed control module 46 can include a motor control toggle switch 47 having three positions. The "off" position in the center, a down "on" position for manual operation and an up "auto" position for automatic sequencing. A blade speed control knob 48 also can be provided for manual adjustment of blade speed at controller 39. Knob 48 is coupled through conductors 49 to actuator 40 (FIG. 1) which, in turn, adjusts the output speed of the variable speed drive and thus blade drive wheel 27. Communication between motor control module 46 and variable speed drive 37 also is accomplished in an automatic mode through electrical conductors 49, which are coupled to actuator 40 for variable speed drive 37.

The rate at which bandsaw 21 cuts workpiece also can be effected by the downward pressure which arm assembly 22 exerts on the cutting blade. Thus, the cutting rate control assembly of controller 39 also may include a cutting force control assembly. The downward cutting force applied to the workpiece is proportional to the weight of arm assembly 22 minus the upward force provided by lift cylinder 33. Increasing the cutting pressure, as shown in gauge 54, will lower the effective weight of saw arm 22. If the pressure is high enough, it will raise saw arm assembly 22. Lowering the indicated pressure at gauge 54 will make the saw arm heavier and increase the force applied to the blade, and thus to workpiece 26. Gauge 54 is coupled to a pressure regulator 56, which in turn is pneumatically connected to cylinder 34 for control of the pressure therein. A manual pressure bleeding knob 57 can be provided on regulator 56 and for automation, the regulator can be coupled to a solenoid or pneumatic actuator 57. Electrical conductors 58 connect actuator 57 to a controller input device 61, which will be described in detail below.

The final component of the control cutting rate control assembly is the assembly for control of the rate of descent of arm 22. As is shown schematically in FIG. 1, variable valve hydraulic assembly 62 controls the return of oil from hydraulic cylinder 33 to tank 63. Arm descent control module 50, therefore, is coupled for manual or automatic adjustment of variable feed rate control valve 62. In the up or "auto" position of switch 64, arm descent is controlled automatically in accordance with input at input device 61. In the middle position, the arm will fall, and in the lower position of switch 64 designated "lift," the arm will be raised.

While comprising a part of the cutting rate control assembly, controller 39 for bandsaw 21 also has additional control features. Controller 39 can be provided with an emergency stop switch 51 which kills power to the controller and motor. If the saw arm is in a up position, it will come down when emergency stop switch 51 is depressed and motor 36 will be shut off. A power on/off switch 52, for all controller and saw power, is provided, with associated light or indicator 53. All switches to the right of power on/off switch 52 must be in the neutral or off position before controller 39 can be powered up by switch 52.

Bandsaw controller 39 can also have a clamp module 66 for controlling the clamping pressure of movable vice jaw 30 on workpiece 26, as well as a gauge 68 and associated panel control knob 69 for varying vice clamping pressure regulator 71. Finally, a broken blade light indicator 72 and an automatic restart switch 73 can be provided.

In addition to the various cutting rate control assemblies described above, controller 39 also include an input device 61, which essentially is a digital computer that is programmed to control the operations of the cutting rate control assemblies based upon operator input and stored programming. Manual input device 61 can take several forms. It is here shown to include a keypad 76 with associated function buttons 77, an L.E.D. display 78, indicator lights 79, a break-in switch 81 and a break-through switch 82.

The manual input module or device 61 is coupled to provide input signals to the various components comprising the cutting rate control assembly in order to control the operation of at least one of the blade speed, the force on the blade or the arm descent rate. Most preferably, all three cutting rate influencing factors are controlled by input device 61. Since it is easiest to vary the saw cutting rate through a wide range of rates by controlling arm descent, in the preferred embodiment the blade speed and downward force of the blade on the workpiece are set for a given sawing task, and the arm descent rate is controlled or varied based upon operator input and the control functions of the present invention.

In order to control the blade speed, cutting force and arm descent rate, input device 61 is electrically connected by conductors 83 to motor control module 46, by conductors 58 to actuator 57 for pressure regulator 56, and by conductors 60 to arm descent control module 50. Arm descent control module 50, in turn, is coupled through conductors 70 to a solenoid actuator 75 (FIG. 1) for hydraulic fluid control valve 62.

Input device 61 is responsive to input in order to generate an input signal to at least one of the components of the cutting rate control assembly. The input signals generated by input device 61 include a cutting rate signal and at least one of a break-in mode signal and a break-through mode signal. The cutting rate signal from input device 61 determines the optimal or desired cutting rate for production cutting of the workpiece.

The cutting rate control assembly is responsive to a break-in mode signal from input device 61 to begin cutting of the workpiece 26 at a break-in cutting rate below the desired or production cutting rate. Moreover, input device 61 automatically produces further break-in mode signals which periodically increase the break-in cutting rate as a function of time until the break-in cutting rate substantially equals the desired or production cutting rate also set by input device 61.

As above noted, input device 61 is essentially a general purpose digital computer having software necessary to produce the desired output signals to the remainder of controller 39 for operation of the cutting rate of bandsaw 21. Moreover, as also was set forth, operator input most typically sets the blade speed and cutting force as part of establishing the desired or production cutting rate. The break-in cutting rate signals, therefore, are used to control arm descent and valve 62.

Setting up the desired or production cutting rate for bandsaw 21 can be accomplished as follows. First, the function key "F" or 91 is depressed followed by a numerical key, in this case the "2" key. L.E.D. display 78 will then display a maximum feed rate for the bandsaw, which is preset at the factory for valve 62. If the maximum feed rate is to be accepted, the operator merely presses the "enter" key 92. If a different feed rate is to be set, the operator presses the "clear" key 93 and the L.E.D. screen goes blank. The operator may then select numeric keys to set a new value for the feed or arm assembly descent rate. When the correct feed rate is displayed at display 78, the "enter" key is pressed and the desired or production feed rate will be set or programmed to the input device 61. The cutting rate signal produced by input device 61 will be communicated to the portion of the cutting rate control assembly which sets the rate of arm descent through conductors 60 to arm control module 50 and thereafter through conductors 70 to actuator 75 for descent rate valve 62.

It is possible for input device 61 to have stored data as to the optimal cutting force and optimal blade speed for any production cutting rate selected using input device 61. Thus, once the production cutting rate is set the blade speed and force would be automatically set. Alternatively, controller 39 can have factory set or default blade speed and cutting force settings, and these values can be changed by the operator using the "speed" and "force" keys. The operator can set the blade speed by pressing "speed" key 90, which causes a display of a factory setting of the blade speed at the L.E.D. display 78. If the blade speed is as desired, the "enter" key is depressed, otherwise "clear" key 93 is depressed and a new blade speed is set using keypad 76. The blade's speed is communicated from input device 61 to motor controller 46 through conductors 83 and thereafter through conductors 49 to motor 36.

The cutting force can be set by pressing "force" key 95 and the factory setting will be displayed at 78. The setting can be entered or changed as described above. Input device 61 then communicates a force signal to actuator 57 through conductors 58.

In improved controller 39 of the present invention, at least one, and most preferably both, of a break-in mode control function and a break-through mode control function are provided. Both of these functions override or change the desired or production cutting rate of the saw blade through the workpiece by changing at least one of the blade speed, blade cutting force and the arm descent rate. Most typically, input device 61 of controller 39 produces break-in and break-through mode overrides of the arm descent rate, with the blade speed and cutting force remaining substantially as established by the operator initially when setting the saw up for a production cut. It will be understood, however, that the feed rate of the bandsaw through the workpiece also can be changed by changing the blade speed or the cutting force or combinations thereof.

Moreover, in controller 39 of the present invention when both a break-in mode override and a break-through override of the cutting rate are in effect, the controller automatically overrides the desired or production cutting rate to the lower of: the break-in mode cutting rate at any given time, and the break-through cutting rate. This allows the break-in cutting rate to override the break-through cutting rate if it is the lower of the two to further reduce the risk of blade damage from blade break-through.

Break-In Mode

Setting the break-in mode for the bandsaw can be accomplished as follows. First, the break-in switch 81 is switched to the "on" position and then the operator can determine what the factory settings are for the initial break-in time, the initial break-in feed rate percentage, whether or not a linear or non-linear increase in the feed rate is to be employed, and if linear, the incremental time and incremental change in feed rate percentage.

As above noted, when a bandsaw is in a break-in mode, it will operate the saw at a feed rate which is below the desired or production feed rate for cutting the workpiece. When in switched into break-in mode, the operator starts by hitting function key 91 and thereafter pressing the "4" key which displays on L.E.D. display 78 the factory setting for the initial break-in time, for example, five minutes. If the time is acceptable, the "enter" button 92 is pressed. Otherwise, the "clear" button 93 is pressed and a new initial break-in time is set using keypad 76 and then entered.

Next, the initial break-in percentage is set. This is done by pressing function key 91 and thereafter pressing the "5" key to display the factory setting, for example, 30%. This means that the break-in feed rate will be 30% of the desired or production feed rate established by the operator for cutting of the workpiece once the saw blade has been broken in. If the factory setting is acceptable, the "enter" button is depressed, otherwise it is cleared and a new setting entered. The operator then presses either the "non-linear" button 96 or the "linear" button 94 to establish the manner in which the cutting rate will be increased. If "non-linear" button 96 is pressed, the rate at which the cutting rate of the bandsaw is increased to the desired or optimal setting rate will be non-linear, for example, an S-shaped rate vs. time curve. This non-linear function can be stored in memory in input device 61 and it will be used to control increases in the arm descent rate from the initial break-in mode descent rate to the final desired or production descent rate. This non-linear profile can be approximated by discrete, small steps.

If "linear" button 94 is pressed, then the break-in feed rate will be increased in a plurality of identically sized steps which occur at the same time increment. The operator, however, can control the size of each step and the time period between steps. This is accomplished by pressing function key 91 and then pressing the "6" key, which displays the factory setting for the incremental break-in time, for example, one minute. This can be entered or cleared and a new break-in time set and entered. Then, the operator presses function key 91 and the "7" key to display the incremental break-in percentage, for example, 3%. This percentage can also be entered or cleared and a new percentage entered.

Once the cutting rate and the break-in mode operating parameters have been set, the operator can start the saw using power switch 52 and motor and arm switches 47 and 64, which are switched to the "auto" position. The saw will then begin the cutting cycle at the initial break-in time and percentage settings established by controller input device 61. The saw will operate and cut workpiece 26 for the time period established by the controller, which then increases or ramps up the cutting rate over time to the desired or production cutting rate for workpiece 26, either in a linear or a non-linear fashion.

The break-in mode allows the operator to set the saw up and then have the saw break-in or gradually dull the saw blade for maximum efficiency in cutting without endangering the saw blade or having the saw operated for long periods of time at cutting rates which are below the production cutting rate.

Break-Through Mode

If nothing more were done, the bandsaw would simply operate at a break-in cutting rate until the cutting rate reached the production cutting rate. This would, however, begin to endanger the saw blade as the arm descent rate was ramped-up because of the likelihood that the saw blade would abruptly punch through thin sections of the workpiece at the bottom of the cut. Accordingly, controller 39 of the present invention additionally preferably has a break-through protection mode.

The operator can establish a break-through mode by switching switch 82 to the "on" position. The function key 91 can be depressed followed by pressing the "8" key to display at L.E.D. display 78 a factory setting for the exit speed or break-through cutting rate of the saw. This factory setting is typically 50% of the desired or production cutting rate for the workpiece being cut. If the factory setting is acceptable, "enter" key 92 can be depressed. Otherwise, the "clear" key 93 is depressed, a new exit break-in percentage is keyed in using keypad 76. The new percentage is displayed at L.E.D. display 78 and can be entered using key 92.

In the controller of the present invention, the input device 61 further compares the break-through exit cutting rate to the break-in cutting rate. In the factory settings noted above, for example, the break-in cutting rate is initially set at 30% of the desired or production cutting rate. The exit cutting rate is initially set at the factory to be 50% of the desired or production cutting rate. Thus, initially, the break-in cutting rate is below the break-through cutting rate, which would result in an increase of the cutting rate early in the break-in cycle if nothing more were done. In the preferred form of the controller of the present invention, however, input device 61 always sends a break-through mode signal to the arm descent rate control valve which is the lower of the break-in cutting rate and the break-through cutting rate. When the break-in cutting rate ramps up above 50% of the desired or production cutting rate, the break-through cutting rate controls operation of the saw arm descent for the distance just prior to saw blade exit or break-through.

There are several techniques which can be used to cause the break-through cutting rate to begin controlling the saw arm descent. One approach is to input the geometry and particularly the height, of workpiece 26 to input device 61. If the height of the workpiece 26 is known and the rate of descent and time of descent is known, the input module 61 can calculate when the saw blade is about to exit the workpiece. When this is calculated to occur, the input device 61 will slow the descent rate to the break-through descent rate.

More preferably, however, a transducer is provided on the saw in a position to sense when arm assembly 22 is about to exit the workpiece. As shown in FIG. 1, transducer 101 may be mounted at the pivotal axle 23 and coupled by conductors 102 to the input module 61. Since workpiece 26 is always supported at the same position on table 41, the saw arm break-through will always occur at the same angle of the arm as sensed at axle 23. At a position just before break-through, therefore, a signal from transducer 101 back to input device 61 can be used to trigger the pre-set break-through or exit speed cutting rate which will slow the saw so as to avoid harmful blade break-through.

While changing the break-through cutting rate has been described as being accomplished by changing the arm assembly descent rate, as was the case for the break-in mode, this cutting rate decrease could be accomplished by changing the blade speed or the cutting force or a combination thereof with the arm descent rate.

The break-through mode also allows the operator to set up the saw and be certain that it will automatically drop down its cutting rate to avoid blade endangering break-through for each piece which is cut.

Method

As will be understood, therefore, the method of controlling the operation of the bandsaw of the present invention is comprised of the steps of inputting a desired cutting rate for the bandsaw through input device 61. The next step is to input a break-in mode input to controller 61. In response to these inputs to the saw, operation of the saw is commenced at a break-in cutting rate below the desired production cutting rate for the saw. Finally, the present method includes the step of automatically increasing the break-in cutting rate over a period of time to the desired or production cutting rate, as determined by a break-in cutting rate control sequence containing controller 39, and particularly input device 61.

The present method can include the further steps of inputting an initial break-in cutting rate to the input device 61 to select the initial break-in cutting rate and thereafter selecting whether the automatic increase shall be linear or non-linear. If the increase is to be linear, the present method includes the further step of inputting an incremental time and inputting an incremental cutting rate increase for the automatic ramping-up of the break-in cutting rate to the desired or optimal cutting rate.

Alternatively, the present method can include the step of automatically increasing the break-in cutting rate by increasing the bandsaw blade speed or cutting force from an initial speed or force below the desired or production bandsaw speed or force through either linear or non-linear steps to the desired or optimal speed or force for the workpiece being cut.

In the break-through aspect of the method of the present invention, a step of inputting a break-through mode input to the control device 61 is accomplished and, when the saw blade is in a position proximate exiting the workpiece, the present method includes the step of automatically reducing the cutting rate of the bandsaw to a break-through cutting rate below the desired or production cutting rate in accordance with the break-through cutting rate mode input to the controller. Moreover, in the break-through mode, the present method includes the step of automatically reducing the cutting rate of the bandsaw to the lower of the input break-through cutting rate and the input break-in cutting rate, when the bandsaw blade is in a position proximate exiting the workpiece, as for example, may be determined by transducer 101.

The apparatus and method of the present invention are highly effective in automating the control of the feed rate of a bandsaw so as to optimize the blade life. Repairing and preferential wear of bandsaw blades is reduced by setting a low break-in cutting rate and increasing it over time to the production cutting rate. For all cuts, the present apparatus and method further reduces the saw cutting rate to an exit rate which will prevent or greatly reduce the likelihood of harmful blade break-through.

What is claimed is:

1. A controller adapted for connection to and control of the operation of a bandsaw having a cutting rate control assembly adapted to control at least one of the blade cutting speed, the blade cutting force, and the feed rate of a bandsaw blade as said blade cuts a workpiece, said controller comprising:

an input device coupled to provide input signals from the bandsaw operator to said cutting rate control assembly, said input signals including a cutting rate signal and a break-in mode signal, said cutting rate signal operating said bandsaw at a desired cutting rate, and the input break-in mode signal causing said cutting rate control assembly to begin cutting of said workpiece at a break-in cutting rate below said desired cutting rate, and the input break-in mode signal causing said cutting rate control assembly to automatically increase said break-in cutting rate as a function of time by steps of predetermined size determined by the input until said break-in cutting rate substantially equals said desired cutting rate.

2. The controller as defined in claim 1 wherein, said break-in mode signal automatically increases said break-in cutting rate in linear steps over time.

3. The controller as defined in claim 1 wherein, said break-in mode signal from said input device automatically increases said break-in cutting rate to said desired cutting rate in a non-linear manner.

4. The controller as defined in claim 1 wherein, said input device is formed for operation input to produce a plurality of break-in signals to said cutting rate control assembly including said break-in mode signal and at least one of a break-in signal setting the initial break-in cutting rate and each subsequent break-in cutting rate, and a break-in signal setting the time of operation at the initial break-in cutting rate and at each subsequent break-in cutting rate; and said break-in signals to control operation of said bandsaw until said desired cutting rate is reached.

5. The controller as defined in claim 1, and a bandsaw having said cutting rate control assembly coupled to receive said cutting rate control signal and said break-in mode signal from said controller.

6. The controller as defined in claim 5 wherein, said cutting rate control assembly is responsive to said break-in mode signal to periodically increase the cutting force of said bandsaw blade to increase the cutting rate from said break-in cutting rate to said desired cutting rate.

7. The controller as defined in claim 5 wherein, said input device is adapted and coupled to provide a break-through signal to said cutting rate control assembly;

said cutting rate control assembly being responsive to the break-through signal to automatically reduce the rate of cutting of the bandsaw from said desired cutting rate to a predetermined lower break-through cutting rate when the saw blade reaches a position proximate exiting of said workpiece.

8. The controller as defined in claim 7 wherein, said cutting rate control assembly is formed to reduce the cutting force in response to the break-through signal.

9. A method of controlling the operation of a bandsaw comprising the steps of:

inputting a desired cutting rate into an input device for a bandsaw controller, said controller being coupled to a bandsaw to control the operation thereof;

inputting a break-in mode input to said controller;

commencing operation of said bandsaw at a break-in cutting rate below said desired cutting rate in response to said break-in mode input; and automatically increasing the break-in cutting rate over a period of time by steps of known size to the desired cutting rate as determined by a break-in cutting rate control sequence contained in said controller.

10. The method of controlling operation of a bandsaw as defined in claim 9 wherein:
said step of automatically increasing the break-in cutting rate is accomplished by increasing the bandsaw feed rate.

11. The method of controlling operation of a bandsaw as defined in claim 10 wherein,
said step of increasing the bandsaw feed rate is accomplished in a plurality of linear steps.

12. The method of controlling operation of a bandsaw as defined in claim 11, and the step of:
inputting a time increment to said input device to select the time duration said bandsaw operates at said break-in rate each step of said plurality of linear steps.

13. The method of controlling operation of a bandsaw as defined in claim 9 and the step of:
inputting a break-through cutting rate input to said controller; and
when said saw blade is in a position proximate exiting said workpiece, automatically reducing the cutting rate of the bandsaw to a break-through cutting rate below the desired cutting rate in accordance with a desired break-through cutting rate contained in the controller.

14. A bandsaw comprising:
a frame;
an arm assembly movably mounted to said frame;
a pair of spaced apart saw blade supporting wheels rotatably mounted to said carriage;
an endless bandsaw blade mounted on said saw blade supporting wheels;
a motor assembly coupled to drive at least one of said wheels;
a cutting rate control assembly carried by said bandsaw and adapted to vary at least one of:
 (i) the speed of driving of said bandsaw blade;
 (ii) the force applied by said bandsaw blade during cutting; and
 (iii) the rate of movement of said carriage during cutting; and
a controller coupled to said cutting rate assembly and adapted to control at least one of the blade speed, blade force and carriage movement, said controller being adapted for input by an operator to select a production cutting rate for cutting a workpiece and further for input by an operator to select at least one of a break-in cutting rate and a break-through cutting rate below said production cutting rate,
said controller being formed to automatically increase said break-in cutting rate up to said production cutting rate over time by steps of known size.

15. The bandsaw as defined in claim 14 wherein,
said controller is formed to increase said break-in cutting rate in linear steps by changing the rate of movement of said carriage during cutting.

16. In combination, a bandsaw and a controller comprising:
a bandsaw having a cutting rate control assembly adapted to control at least one of the blade cutting speed, the blade cutting force, and the feed rate of a bandsaw blade as said blade cuts a workpiece, said bandsaw further including a transducer positioned to sense when said saw blade reaches a position proximate exiting said workpiece; and
a controller coupled to transmit cutting rate control signals and break-in mode signals to said cutting rate control assembly and coupled to receive a saw blade position signals from said transducer, said controller further including an input device coupled to provide input signals to said cutting rate control assembly for control of the operation of the bandsaw, said input signals including a cutting rate signal, a break-in mode signal, and a break-through cutting rate signal, and said controller being responsive to said saw blade position signal to reduce the bandsaw cutting rate to a cutting rate which is the lower of the break-in cutting rate and the break-through cutting rate when the saw blade reaches said position proximate exiting of the workpiece.

17. A method of controlling operation of a bandsaw comprising the steps of:
inputting a desired cutting rate into an input device for a bandsaw controller, said controller being coupled to a bandsaw to control the operation thereof;
inputting a break-in mode input to said controller;
inputting a break-through mode input to said controller;
commencing operation of said bandsaw at a break-in cutting rate below said desired cutting rate in response to said break-in mode input;
automatically increasing the break-in cutting rate over a period of time to the desired cutting rate as determined by a break-in cutting rate control sequence contained in said controller; and
when said saw blade is in a position proximate exiting said workpiece, automatically reducing the cutting rate to a lower of the input break-through cutting rate and the break-in cutting rate when the saw blade is in said position proximate exiting the workpiece.

18. A bandsaw comprising:
a frame;
an arm assembly movably mounted to said frame;
a pair of spaced apart saw blade supporting wheels rotatably mounted to said carriage;
an endless bandsaw blade mounted on said saw blade supporting wheels;
a motor assembly coupled to drive at least one of said wheels;
a cutting rate control assembly carried by said bandsaw and adapted to vary at least one of:
 (i) the speed of driving of said bandsaw blade;
 (ii) the force applied by said bandsaw blade during cutting; and
 (iii) the rate of movement of said carriage during cutting; and
a controller coupled to said cutting rate assembly and adapted to control at least one of the blade speed, blade force and carriage movement, said controller being adapted for input by an operator to select a production cutting rate for cutting a workpiece and further for input by an operator to select at least one of a break-in cutting rate and a break-through cutting rate below said production cutting rate, said controller being further formed to increase said break-in cutting rate by changing the rate of movement of said carriage during cutting, said controller being formed for input of a break-through cutting rate in addition to said break-in cutting rate, and
said controller controlling the cutting rate of said bandsaw by selecting the lower of the break-in cutting rate and the break-through cutting rate when said saw blade exits said workpiece.

* * * * *